(12) United States Patent
Narayanaswami et al.

(10) Patent No.: US 7,185,204 B2
(45) Date of Patent: Feb. 27, 2007

(54) METHOD AND SYSTEM FOR PRIVACY IN PUBLIC NETWORKS

(75) Inventors: Chandrasekhar Narayanaswami, Wilton, CT (US); Mandayam Thondanur Raghunath, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 10/649,832

(22) Filed: Aug. 28, 2003

(65) Prior Publication Data

US 2005/0050352 A1  Mar. 3, 2005

(51) Int. Cl.
*G06F 9/24* (2006.01)
(52) U.S. Cl. .................. 713/182; 713/155; 713/161
(58) Field of Classification Search ............... 713/182, 713/155, 161
See application file for complete search history.

(56) References Cited

OTHER PUBLICATIONS

Asokan, N., et al., The State of the Art in Electronic Payment Systems. IEEE Computer 30(9), Sep. 1997, 28-25.
Chaum, D., Untraceable electronic mail, return addresses, and digital pseudonyms. Communications of the ACM, vol. 24, No. 2, (1981), pp. 84-88.
Cranor, L.F.: The Role of Privacy Enhancing Technologies, In Considering Consumer Privacy: A Resource for Policymakers and Practitioners, Center for Democracy and Technology, Mar. 2003, pp. 80-83.
Dyer, J.G., et al., Building the IBM 4758 Secure Coprocessor, IEEE Computer, vol. 34, No. 10, (2001), pp. 57-66.
Gupta, V., et al., "Experiments in Wireless Internet Security", in Proc. Wireless Communications and Networking Conference, (Mar. 2002), pp. 860-864.
Kotz, D., et al., "Analysis of a Campus-Wide Wireless Network", Proc. of the 8th Annual Int'l Conf. on Mobile Computing and Networking, ACM Press, (2002), pp. 107-118.
Low, S.H., et al., Anonymous Credit Cards. In Proceedings of second ACM Conference on Computer and Communication Security. (1994), pp. 108-117.
Molina-Jimenez, C., et al., Anonymity without Mixes. In: Second IEEE Workshop on Internet Applications (WIAPP '01), San Jose, CA (2001), pp. 32-40.
Goldschlag, D.M., et al., Onion Routing for Anonymous and Private Internet Connections, Communications of the ACM, vol. 42, No. 2, (1999).
T. Narten, et al., Privacy Extensions for Stateless Address Autoconfiguratoin in IPv6. IETF RFC 3041, Network Working Group, The Internet Society, 2001, pp. 1-17.
Orava, P.H., et al., Temporary MAC Addresses for Anonymity, IEEE Document doc.: 802.11-02/261r2.
Borisov, N., et al., Intercepting mobile communications: The insecurity of 802.11. In Proceedings of MOBICOM 2001, pp. 180-189.
Federal Register/vol. 68, No. 34, Feb. 20, 2003, Rules and Regulations, "Health Insurance Reform: Security Standards", Department of Health and Human Services, pp. 8334-8342.

(Continued)

*Primary Examiner*—Thomas R. Peeso
(74) *Attorney, Agent, or Firm*—Stephen C. Kaufman, Esq.; McGinn IP Law Group, PLLC

(57) ABSTRACT

A method (and system) for providing location privacy, includes, for a mobile computing device, assigning a pool of addresses with which a user can access a network, and preventing a third party from correlating a user's location with the mobile computing device.

58 Claims, 8 Drawing Sheets

OTHER PUBLICATIONS

Reiter, M.K. et al., Anonymity for Web Transactions. ACM transactions on Information and Systems Security, (1)1, pp. 66-92, Jun. 1998.

Jiang X., et al., Approximate Information Flows: Socially-Based Modeling of Privacy in Ubiquitous Computing. In proceedings of Ubicomp (2002), pp. 176-193.

Langheinrich, M., Privacy by design: Principles of Privacy-aware Ubiquitous Systems, In Proceedings of Ubicomp, (2001), pp. 273-291.

Mishra, A., et al., An Initial Security Analysis of the IEEE 802.1X Standard, Dept. of Computer Science, Univ. of Maryland at College Park, CS-TR-4328, (Feb. 2002).

Nguyen, David H., et al., Privacy Mirrors: Understanding and Shaping Socio-technical Ubiquitous Computing Systems. Georgia Institute of Technology Technical Report G1T-GVU-02-16. Jun. 2002.

Reed, M., et al., Protocols using Anonymous Connections: Mobile Applications, 1997 Security Protocols Workshop.

Convery, S., et al., "Cisco SAFE: Wireless LAN Security in Depth", Cisco Systems, 1992-2003, pp. 1-75.

"A History of Privacy Issues: Intel Pentium III Processor Serial Number", Center for Democracy & Technology, 2001, pp. 1-2.

"Wireless Location Privacy", Center for Democracy & Technology, 2001, pp. 1-3.

100

200

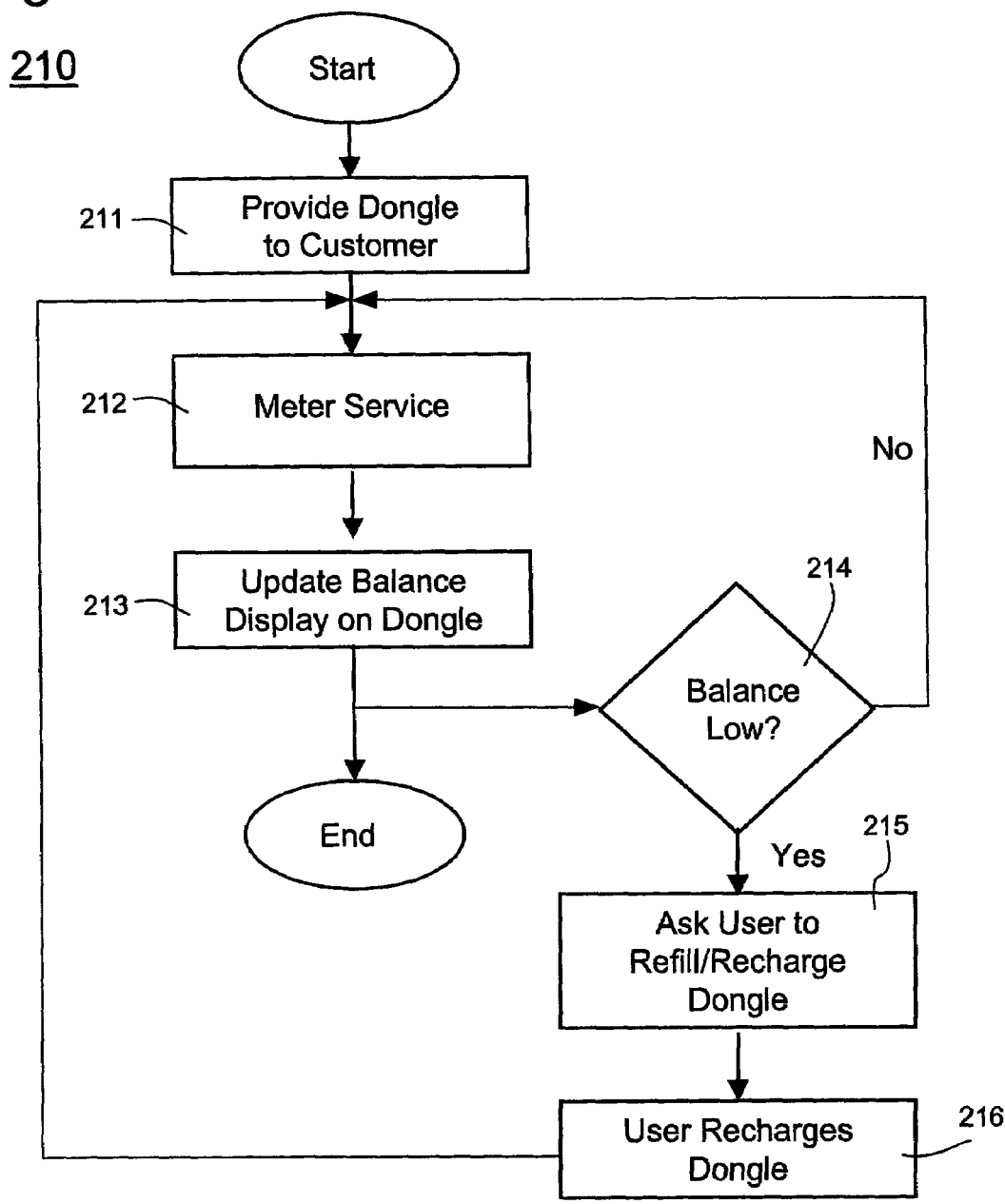

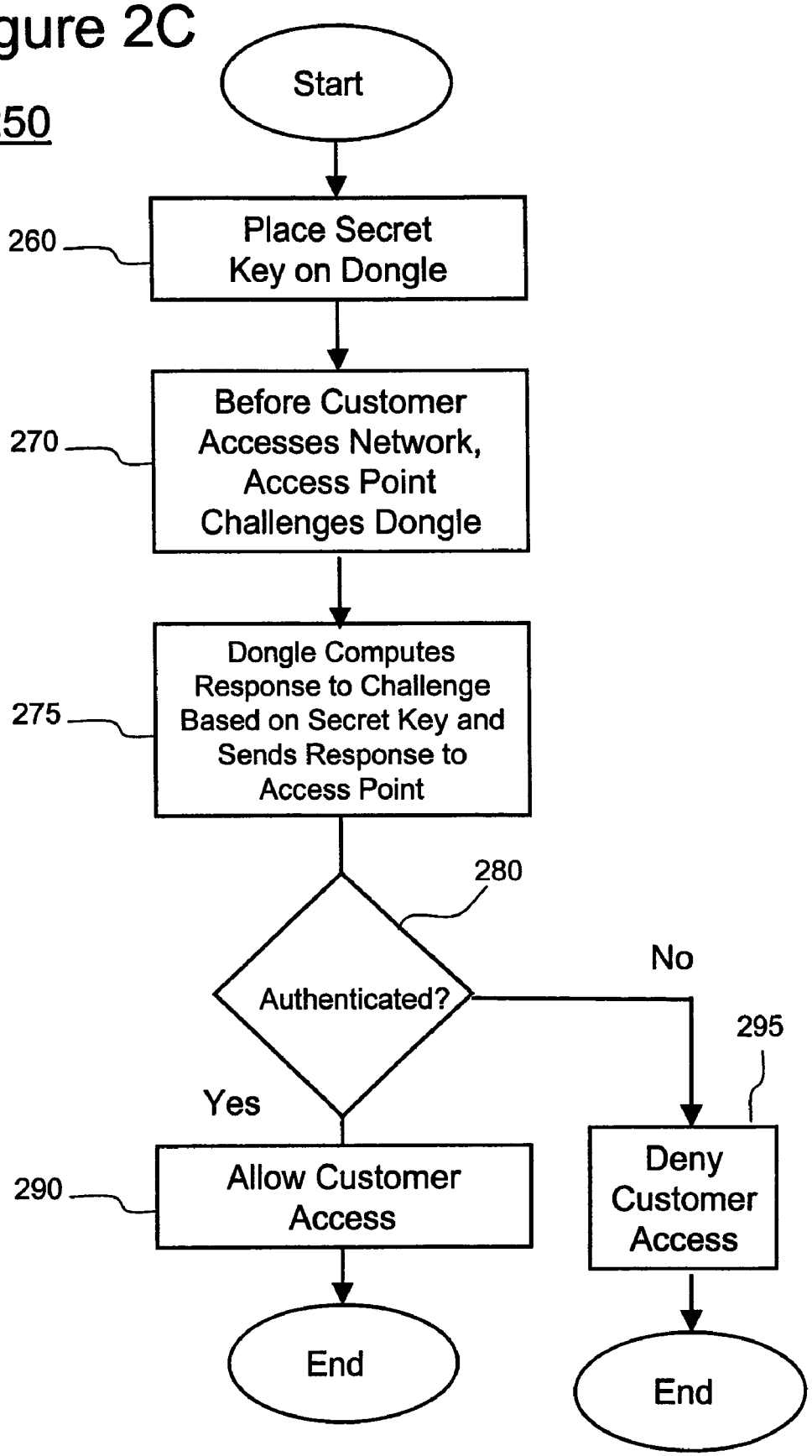

300

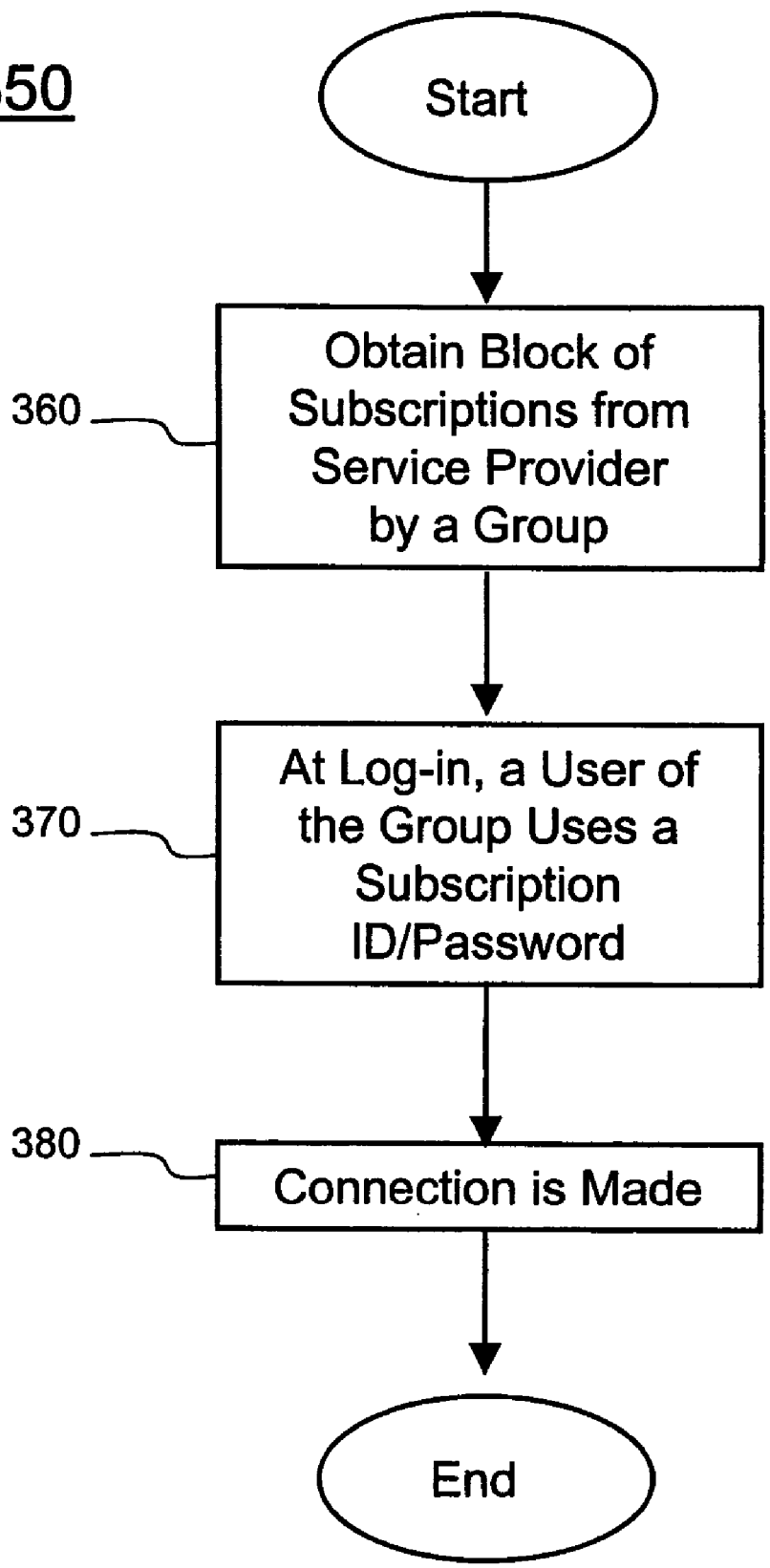

METHOD AND SYSTEM FOR PRIVACY IN PUBLIC NETWORKS

BACKGROUND OF THE INVENTION

1. Field of the Invention

The present invention generally relates to a method and system for preserving a user's privacy in a public network, and more particularly to a method and system for preserving a user's privacy in an 802.11 network (e.g., a so-called "WiFi Network").

2. Description of the Related Art

Over the last few years, there has been a tremendous growth of wireless LANs from availability in university and technology companies to widespread availability in other enterprises and in public places such as trains, busses, airports, coffee shops, fast-food restaurants, etc.

Recently, commercial airlines have begun offering this technology on certain trans-Atlantic flights. It can be argued that high speed wireless LANs are one of the most significant developments in mobile computing in recent times. Indeed, the relatively low cost of 802.11 hardware has made it attractive for people to deploy a wireless network even in their homes, especially if they have a broadband connection to the Internet.

Some companies, such as Boingo™, Wayport™, Tmobile™, Cometa™, etc., offer various plans for nationwide (USA) 802.11 (e.g., the wireless protocol known as "WiFi") wireless access through "hotspots" distributed across the country. Typical plans include one hour, one-day, ten-day, unlimited for a month, and other forms of metered access. Current service costs also appear to be affordable. Recent laptop computers offer built-in 802.11 interfaces. Handheld computers may soon follow with built-in 802.11 interfaces as well.

Overall, WiFi networks have changed the way business professionals work. Just as the cellular (e.g., mobile) telephone helped liberate people from the land line, WiFi access is helping liberate people from wired networks. People are less tied to their desks. Instead of having to carry network cables and finding seats next to network jacks in meeting rooms, people can sit anywhere they like. Business travelers may synchronize their e-mail or download information from their corporate intranet during lunch at a restaurant. WiFi networks at airports and inside planes are likely to help travelers stay in touch and get more work done during their travel.

However, the above benefits and flexibility of ubiquitous and affordable wireless access in public spaces also raise certain issues, including privacy and security. That is, who else in the public space can see the data that is being sent to the user? Also, can the service provider constantly track your physical location? Can the service provider build a profile of the web sites a user visit? How much of a user's privacy does one need to give up in order to benefit from these services?

The initial security mechanism for 802.11 networks, called WEP, turned out to have serious problems (e.g., see Borisov, N., Goldberg, I., David Wagner, D.: Intercepting mobile communications: The insecurity of 802.11. In Proceedings of MOBICOM 2001, (2001) 180–189) rendering it largely ineffective as a security mechanism. Vendors have developed several proprietary mechanisms to mitigate the security loopholes of WEP (e.g., see Convery, S., Miller, D., Sundaralingam, S: Cisco SAFE: Wireless LAN Security in Depth http://www.cisco.com/warp/public/cc/so/cuso/epso/sqfr/safwl_wp.htm). Security initiatives such as 802.1X (e.g., see, A., Arbaugh, W.A.; "An Initial Security Analysis of the IEEE 802.1X Standard, Dept of Computer Science, Univ. of Maryland at College Park, CS-TR-4328, (February 2002)) are currently underway in the standards bodies (e.g., see Mishra4. IEEE 802.11 Wireless LAN Standards. IEEE 802.11 Working Group (http://grouper.ieee.org/groups/802/11/).

While security is a closely related topic, an important issue is privacy of the users of public WiFi networks.

Specifically, the protection of location privacy, namely safeguards that enable users of WiFi networks to avoid revealing their current location as they move among different wireless hotspots, would be important and would enable the further development and utility of WiFi networks.

When the portable computer belonging to a user connects to a WiFi network, the network operator can tell which access point the user is associated with. With adequate information about the location of the access points, the user can be located to within a few meters. For instance, it may possible to pinpoint the location of a user to a particular floor of a hotel, or a particular section of an airport terminal. It may also be possible to know that an individual is currently enroute on a particular flight from London to New York.

WiFi networks carry the potential for revealing much more precise location, compared to other widely-deployed technologies such as cell phones or pagers (e.g., see Wireless Location Privacy, http://www.cdt.org/privacy/issues/location/ http://www.cdt.org/privacy/issues/location/).

WiFi networks operate with much smaller "cell" sizes because they are required to operate at lower power levels and in environments that have poor signal propagation and interference properties. Small cell sizes help maintain signal quality and higher communication bandwidth.

With the increasing popularity of WiFi networks, comes an increasing user population that is likely to have little or no technical background. These users are unlikely to understand how wireless communication works. It is also improbable that they will understand how their privacy can be compromised. They are even less likely to understand and follow security protocols to help improve their privacy. Price and ease of use are generally the overriding factors that determine success of a mass-market offering targeted to such users. It is imperative that privacy protection be made possible without an increase in price, or additional explicit actions by the user.

Their lack of knowledge not withstanding, users still have several tacit expectations of the technology. Technologists should deliver (e.g., see Cranor, L. F.: The Role of Privacy Enhancing Technologies, In Considering Consumer Privacy: A Resource for Policymakers and Practitioners, Center for Democracy and Technology, March 2003, pp. 80–83) on these expectations even though the users may not be able to express their expectations in terms technologists use (e.g., see Langheinrich, M., Privacy by design: Principles of Privacy-aware Ubiquitous Systems, In Proceedings of Ubicomp (2001) 273–291). Delivering on these expectations is a fundamental requirement for achieving the vision of truly ubiquitous computing (e.g., see Weiser, M.; The Computer for the 21st Century, Scientific American 1991, 265(3), 94–104).

Safeguarding privacy is like transporting water using a bucket that is riddled with holes. Newer technologies, and their usage modes, tend to create more holes in the bucket. While one may not be able to plug all the holes in the bucket, it is still worthwhile to examine each hole individually and to devise means to plug that particular hole. Existence of a hole elsewhere in the bucket is not a justification for creating a new hole, or to avoid plugging one that can be plugged.

Prior to the present invention, there has been no simple and practical solution to the leaking of fine-grain location information as mobile users take advantage of pervasive wireless Internet access services. Moreover, there has been no practical solution which has been simple and easy for non-technical users to adopt and believe. Further, there has been no cost-effective and attractive enough solution so that service providers find it better than alternatives that lack privacy properties.

A simple approach to providing WiFi access involves a subscriber establishing an account with a service provider. To establish the account, the subscriber will typically provide her name, address, and a credit card number. In addition, the service provider may collect other personal information such as phone numbers, and an e-mail address. The subscriber will establish a login id and password as part of the service set up.

Subsequently, the subscriber will sign on using the login id and password to obtain WiFi access. The service provider will use the login id to measure the subscriber's usage and bill the subscriber for the service. The service provider may also have roaming agreements with several other providers to enable subscribers to obtain WiFi service at various locations.

The service provider will prepare a service agreement which states what information they gather about subscribers, how long they retain the information, how they use the information, and who they share that information with. The service agreement will typically run to several pages of legal language that most subscribers will not fully comprehend, or even bother to read. Nevertheless, the service provider insists that the subscriber sign a statement accepting their terms. Most subscribers will assume that the agreement is benign, and sign it without fully understanding the implications. The subscriber's signature gives the service provider a license to use the information gathered about the subscriber.

Most subscribers will generally be unaware of the amounts of information that the service provider can potentially obtain and link with them. The individual pieces of information may just be minor privacy leaks. However, when someone can build a bigger picture by correlating different bits of information and associating all of these bits of information with a particular subscriber, the privacy invasion becomes much more worrisome. If the details of the correlated information gathered about a subscriber, is subsequently revealed to her, the reaction will generally be one of shock and disbelief. For instance the service provider may be able to tell which cities a subscriber visited. Depending on the extent of WiFi coverage, the service provider may have knowledge of which restaurants or other public places the subscriber visited and at what times. The service provider may also know which web sites the subscriber normally visits and what kinds of information she reads.

Kotz and Essien (e.g., see Kotz, D., and Essien, K.; "Analysis of a Campus-Wide Wireless Network", Proc. of the 8$^{th}$ Annual Intl. Conf. on Mobile Computing and Networking, ACM Press, (2002), 107–118) have shown that it is possible to collect several pieces of information about WiFi users and also correlate pieces of information that are gathered at different geographic locations at different points in time. They collected data at a university WiFi network, using simple low cost instrumentation. The analysis and correlation were also done using relatively inexpensive hardware. Even so, a detailed and rich picture was built of the users of the WiFi network. A service provider with a profit motive and access to additional resources, could be easily tempted to collect, correlate, and hoard much more information.

Once such information is available, it may be used in ways that may surprise most subscribers. An employee of the service provider might notice that the mobile computers belonging to top executives of company A are frequently seen at the same hotspots as the mobile computers of the top executives of company B. This might lead the employee to speculate on an impending deal between the companies even if all the communication between the two companies was both oral and private. A business may want to buy the e-mail addresses of people who travel on a particular route and send them targeted e-mail solicitations.

It is noted that the security mechanisms that are being proposed to replace WEP will do not prevent the service provider from gathering and using information. While 802.11 security schemes may prevent malicious bystanders from snooping the subscriber's Internet traffic or modifying the traffic in nasty ways, it is unlikely that the proposed security schemes will impose any form of deterrent on the service provider from obtaining and logging information about a subscriber.

Many subscribers will typically establish an IPSec/NVPN connection to the intranet at their place of employment because of corporate requirements. The VPN tunnels hide Intranet traffic from the service provider and everyone else.

However, any traffic to Internet sites are typically sent directly, and can be observed by the service provider unless protected by SSL. More importantly, establishment of a VPN does not prevent the leak of location information to the service provider.

Safeguarding personal privacy is a fundamentally difficult problem because businesses inherently seek more information about people they serve. In general, the more information a business has about its customers, the better its chances of catering to the needs of its customers, and better its chances of improving profits. All things being equal, a business that has more information is likely to outperform its competition. Any privacy mechanism designed to safeguard user privacy must fight this fundamental proclivity of businesses seeking more information about their customers.

Businesses sometimes cannot function without obtaining certain pieces of personal information about its customers. For instance, laws require some businesses to obtain private information about their customers. U.S. financial institutions are required to obtain social security numbers in order to report income to the government.

Ignorance of the ways in which private information is collected and used enables businesses to develop technologies and business models that continue to punch holes in the privacy bucket. Businesses often develop innovative and useful services that leverage such information. Once such a service has been deployed, it may be hard to justify technologies that plug the privacy leak which enabled the service. It may also be difficult to lobby for laws that plug the leak because privacy advocates would be pitted against customers and businesses who benefit from the service.

Ignorance and apathy among users, helps businesses avoid compensating the users for the usage of information. As businesses exploit some private information successfully, they are encouraged to collect even more. Effectively, a vicious cycle gets established, resulting in a continuous and progressive erosion of privacy.

Sometimes users are offered a benefit for giving up some private information, and sometimes the information is stolen from them without their knowledge. At other times, giving up information is made a precondition to obtaining a service. For instance, many U.S.-based mobile phone companies collect customer social security numbers to run credit checks.

Given the motivating factors described above, safeguarding privacy seems difficult. However, there are a several factors working in favor of maintaining privacy. Some factors that prevent businesses from gathering and using more information than they rightfully require, include laws that place limits on the businesses, the cost of acquiring, retaining and processing huge volumes of information, the tendency of businesses to protect information they hold, the bad publicity that might arise if customers were to learn about the information that is being gathered about them, and how the information was being used, and competitive pressures.

Laws: Fundamentally businesses exist to generate revenues and profits. However, they must obey the laws that govern their behavior. Nations often pass laws that intend to safeguard user privacy. However, a majority of the people are unaware that their privacy is being violated. As a result, law makers seldom hear requests or demands for stringent privacy protection laws. As technologists we help people become more aware of privacy issues (e.g., see Nguyen, David H., and Elizabeth D. Mynatt. Privacy Mirrors: Understanding and Shaping Socio-technical Ubiquitous Computing Systems. Georgia Institute of Technology Technical Report GIT-GVU-02-16. June 2002) are public is likely to pressure their law makers to make laws that protect privacy. An aware public will also pressure lawmakers into avoiding laws that mandate the collection of excessive amounts of data.

One recent example is Health Insurance Portability and Accounting Act (HIPAA) (e.g., see Health Insurance Reform: Security Standards Final Rule, Federal Register Vol 68, No 34., http://aspe.hhs.gov/admnsimp/FINAL/FR03-8334.pdf), where the U.S. federal governing body has specified the privacy requirements for medical records in great detail. The European Union has also passed several laws aimed at protecting privacy.

Data Acquisition and Management Costs: In several cases, the high cost of acquiring and managing the data works in favor of privacy. If businesses cannot perceive a near term return on their investment in data gathering and management costs, then it is unlikely that they will bother.

For instance, due to the recent regulations, cell phone providers are required to deploy technologies capable of precisely locating subscribers who call to report an emergency situation.

However, there is usually a significant cost involved in obtaining precise location. This high cost generally prevents cell phone providers from tracking all of their subscribers at the same level of precision at all times. Nevertheless, better technologies are rapidly reducing the cost of collecting, managing and correlating information. As costs reduce, the return-on-investment equation becomes easier to satisfy.

Information hoarding: One business may acquire some information about a particular user and another business may acquire some other information about the same user. If the two businesses were able to share and cross-correlate their databases, then they may be able to build a user profile that is much more complete. However, businesses tend to be protective of the data they control and tend not to share. Nevertheless, mergers and acquisitions amongst businesses can eliminate such barriers (e.g. In 1999 online advertising company DoubleClick merged with an off-line consumer database Abacus Direct (e.g., see Privacy Groups See Danger in Merger, New York Times, Jun. 22, 1999. Section C, Page 6). The merged organization intent to correlate their databases was the subject of several complaints and lawsuits.)

Brand Image: Businesses place a high value on their image in the public view and are wary of publicity that can impact this image negatively. A business that receives public attention as a result of their privacy violations (or even potential privacy violations) often suffers a significant blow to their brand image. There are several well-known examples such as the recent release of many credit card numbers, unique serial numbers on CPU chips (e.g., see Intel Pentium® III Processor Serial Number, http://www.cdt.org/privacy/issues/pentium3/), etc. As a result, publicity concerning the misuse or leakage of private information, is a powerful deterrent aiding privacy protection.

Competition: Another powerful factor motivating businesses to honor privacy is marketplace competition. If one business develops a technology and business model that can offer better privacy protection to its customers, then its competitors may be pressured into adopting similar models. If a business can advertise its privacy advantages in the popular media, then its competition will be under greater pressure. Effectively competition can build a virtuous cycle that encourages businesses to outdo each other on the privacy front.

It is noted that for privacy to be a selling point, the technology must be simple and obvious enough that a short 30 second TV commercial or a half page of printed advertising can explain the advantages to the customer. The privacy advantages of the solution should be self-evident to most non-technical customers. Privacy enhancing mechanisms must be easily adopted by non-technical users. Solutions that meet these requirements are candidates capable of creating virtuous cycles.

Solutions capable of creating virtuous cycles may already exist. Lack of awareness may be the only issue preventing the cycle from taking hold. A virtuous cycle leading to the eventual demise of caller-id, can be initiated by one phone company offering caller-id blocking as the default and free option, actively advertising the privacy benefits of their service, and successfully stealing customers from their competitors.

Thus, prior to the present invention, there has been no mechanism which has improved awareness of privacy issues, and secondly there has been no method or system for developing privacy enhancing solutions that are simple to understand and easy to deploy.

SUMMARY OF THE INVENTION

In view of the foregoing and other exemplary problems, drawbacks, and disadvantages of the conventional methods and structures, an exemplary feature of the present invention is to provide a method and structure for providing awareness of privacy issues.

Another exemplary feature is to provide a method and system for developing privacy enhancing solutions that are simple to understand by a user and easy to deploy.

In a first exemplary aspect of the present invention, a method (and system) for providing location privacy, includes, for a mobile computing device, assigning a pool of addresses with which a user can access a network, and preventing a third party from correlating a user's location with the mobile computing device.

In a second exemplary aspect of the present invention, a method (and system) for providing a connection to an access point to a network, includes providing a detachable network interface for use in accessing the access point by a computing device without intervention by a user. The detachable network interface breaks a linkage between a media access control (MAC) address associated with the computing device and the user.

In a third exemplary aspect of the present invention, a method for deploying computing infrastructure, includes integrating computer-readable code in to a computing system, wherein the code in combination with the computing system is capable of performing the above-described methods.

In a fourth exemplary aspect of the present invention, a signal-bearing medium tangibly embodying a program of machine-readable instructions executable by a digital processing apparatus to perform the above-described methods.

With the unique and unobvious exemplary aspects of the present invention, improved awareness of privacy issues is provided from both a user's perspective and from a service provider's perspective in providing a service which would offer a competitive advantage to the service provider.

Further, the invention has developed privacy-enhancing solutions that are simple to understand and easy to deploy from a user's point of view. Thus, there are several features which a user can implement to safeguard their privacy, without the support or interaction of the service provider.

Indeed, the invention provides a simple and practical solution to plug the hole that leaks fine-grain location information as mobile users take advantage of pervasive wireless Internet access services. The solution of the invention is simple and easy for non-technical users to adopt and believe in, as well as cost-effective and attractive enough so that service providers find it better than alternatives that lack privacy properties.

Additionally, from the service provider's point of view (e.g., what the service provider can do to offer the user enhanced privacy and thus gain a competitive advantage over other service providers), a detachable dongle may be provided in which a secret key may be employed (e.g., either a key used for all dongles, or a dedicated, separate key for each dongle).

Further, the dongle may provide a balance display to the user and to allow for trading of the dongle (e.g., a tradable commodity), thereby breaking the linkage between the MAC address and the user.

BRIEF DESCRIPTION OF THE DRAWINGS

The foregoing and other purposes, aspects and advantages will be better understood from the following detailed description of an exemplary embodiment of the invention with reference to the drawings, in which:

FIG. 2B illustrates a flowchart of a method 210 according to a first exemplary embodiment of the present invention from a perspective of the service provider;

FIG. 2C illustrates a flowchart of a method 250 according to a second exemplary embodiment of the present invention;

FIG. 3C illustrates a flowchart of a method 350 according to a second exemplary embodiment of the present invention from the user's point of view;

DETAILED DESCRIPTION OF EXEMPLARY EMBODIMENTS OF THE INVENTION

Figure 1:
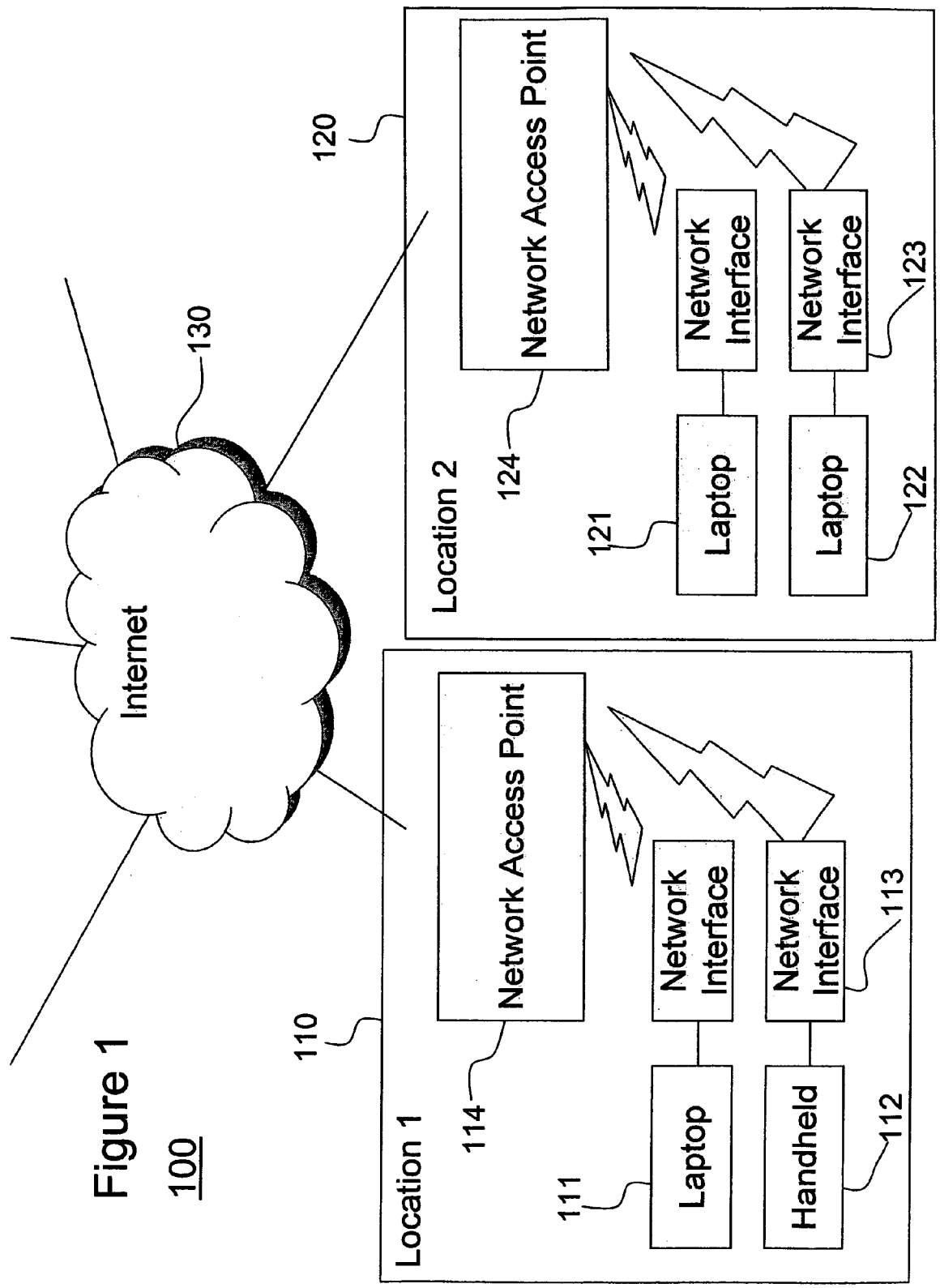
FIG. 1 illustrates a block diagram of a structure 100 according to the present invention from a perspective of a service provider.

Referring now to the drawings, and more particularly to FIGS. 1–5, there are shown exemplary embodiments of the method and structures according to the present invention.

Exemplary Embodiment

Service providers have several objectives. At a minimum, the service provider must be able to show a profit. They must be able to sign up a large number of customers to cover their large infrastructure costs.

Other desirable objectives include the ability to offer their customers a choice of service plans and a choice of payment options. It is also important for service providers to prevent the theft of service by non-paying "customers". (Generally, most service providers settle for limiting the amount of theft rather than outright prevention, since cost of outright prevention may outweigh the cost of tolerating limited theft). Service providers also want to design some affinity into their services so that customers incur a cost to switch to a competitor. Affinity and superior service can help retain customers and improve long term profitability.

The inventive solution addresses both user privacy concerns and service provider requirements.

The present invention generally operates by examining each unique identifier that can be used to associate location information with a particular subscriber, and making each such identifier useless.

In exemplary computer networks (e.g., WiFi networks), there are two identifiers that can be used to compromise location privacy. The first is the user id that is typically assigned as part of the sign-on process. Once this user id is rendered useless, the next identifier of concern is the globally unique network interface identifier (media access control (MAC) address).

Hereinbelow is described the inventive solution from the two perspectives of the subscriber and the service provider, and then a detailed analysis is provided of how the solution succeeds in achieving its goals.

Exemplary Solution From Service Provider's Perspective

FIG. 1 illustrates a block diagram of a system 100 according to the present invention.

System 100 includes a plurality of location (e.g., first and second locations 110, 120), each of which is connectable via a network 130 (e.g., a public network such as the Internet).

Location 110 includes a mobile computing device 111 (e.g., a laptop, IBM ThinkPad®, etc.), a handheld device 112 (e.g., a Personal digital assistant (PDA) such as a Hewlett-Packard IPAQ® or the like), each of which is connectable to a network interface 113.

Network interface 113 is connectable to the network 130 via a network access point 114.

Location 120 may have a similar structure as location 110, and may include a mobile computing device(s) 121, 122, each of which is connectable to a network interface 123. Network interface 123 is connectable to the network 130 via a network access point 124.

Figure 2A:
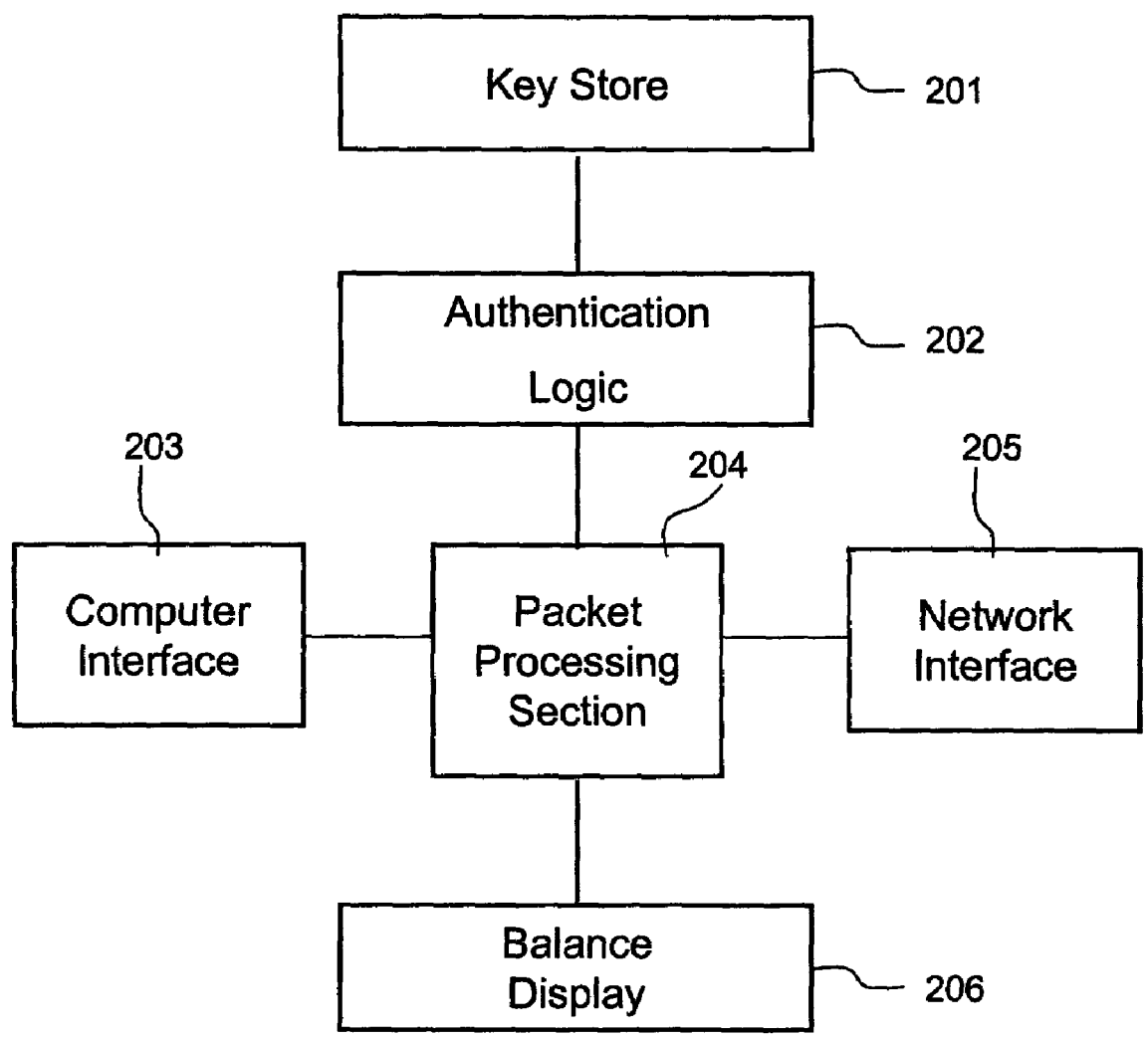
FIG. 2A illustrates a block diagram of a dongle 200.

The inventive solution to the WiFi access problem is based on providing a dongle 200, as shown in FIG. 2A, and more particularly to a computer interface (e.g., a Universal Serial Bus (USB) interface) (e.g., a hardware key) which subscribers can purchase from stores or vending machines by paying cash if they choose to. The dongle enables the subscriber to access WiFi services provided by a particular provider.

Specifically, as shown in FIG. 2A, the dongle 200 includes a key store 201 for storing a key (secret) which gets set up when the dongle is sold, etc., an authentication logic 202 for performing some computation based on the key and for providing an output (creates packets) to allow the dongle to authenticate itself, a computer interface 203 (e.g., a USB interface), a packet processing section 204 for receiving the output from the authentication logic 202, thereby to allow the packet processing and throughput to occur, a network interface 205 (e.g., a WiFi network interface; similar to that of network interface 113/123), and a balance display 206.

Thus, the dongle has two interfaces between the user's computer and the network, with the section 204 including the hardware for processing of the packets to/from the computer to/from the network.

Again, the balance display 206 shows the user how many units (e.g., minutes, money, etc.) are available using the present dongle. Thus, the user can readily view the account balance in the dongle.

The Method

Turning to FIG. 2B, the method 210 is shown according to the service provider's point of view in which, in step 211, the dongle 200 is provided to a customer for their use.

In step 212, the service provider meters the service used by the customer. Preferably, the service provider maintain a data based indexed by MAC addresses indicating the balance left on the corresponding dongle.

In step 213, the balance display 206 of the dongle 200 is updated. Specifically, as the dongle is used up, the service provider may provide a message to the user that the dongle should be refilled or recharged by the user.

More specifically, if the balance is low as determined in step 214 (e.g., a "YES"), then the user is asked to refill/recharge the dongle 200 in step 215. Then, in step 216, the user recharges the dongle and continues to access the network through the hot spot. If the balance is not low as determined in step 214 (e.g., a "NO"), then the process loops to step 212 and the service is continued to be metered.

When the subscriber plugs the dongle 200 into her mobile device 111 (e.g., the computer interface 203 of FIG. 2A) at a wireless "hotspot", the dongle 200 discovers that it is in a "hot spot", and authenticates itself automatically and connects to the network via network interface 205. Thus, the explicit sign-on step required by traditional schemes is eliminated. Once connected, the subscriber has access to the network (e.g., the Internet).

Specifically and turning to FIG. 2C, the method 250 is shown according the service provider's point of view in which the processing of the dongle (e.g., authentication of the dongle) and whether to allow the user to access the access point of the network is shown.

Specifically, in step 260, a secret key is placed on the dongle in advance.

For the authentication, in step 270, the hot spot will issue a challenge to the dongle 200.

Then, in step 275, the dongle takes the challenge by the authentication logic 202 performing a computation based on the secret key 201, and will issue a response packet back to the hot spot over the network interface 205, so that the dongle can authenticate itself.

In step 280, it is determined whether the dongle is valid or not. That is, the hot spot then examines the response packet, and indicates whether the dongle is valid and, if so, may optionally indicate a balance on the balance display 206 (e.g., the balance may be updated at this point).

Assuming that the dongle 200 is valid (e.g., "YES" in step 280), then the customer is allowed access such that packets are allowed from the dongle 200 to go out to the network (e.g., the Internet). If the dongle 200 is invalid (e.g., a "NO" in step 280), then in step 295 the customer is denied access.

Thus, the dongle 200 allows for authentication of the same without user intervention or involvement. That is, as described above, the dongle can perform the authentication and the sign-on without any involvement from the user (other than plugging the dongle into the user's machine and network interface. Normally, in the conventional systems, the user must manually do some action (e.g., typing in a user name, password, etc.) to authenticate and be granted access. In the present invention, by having the keys and the authentication logic in the dongle, the dongle does all of the authentication and sign on without the user performing any explicit steps or action.

As described herein, the dongle 200 can use a key which is used for all dongles, or can use a per-dongle key provided only to a specific dongle, such that each dongle has a different secret key.

The price of the dongle preferably includes at least two components. Specifically, the dongle may include a deposit amount which is refunded when the subscriber returns the dongle, and a pre-paid service fee for a certain amount of service. The deposit amount may be lower for long-term service plans.

As the subscriber spends time using the service, the pre-paid amount left on the dongle 200 reduces at a rate depending on the service plan she picked when she purchased the dongle. The display 206 preferably is a small digital display showing both the deposit amount and the amount of money (or the amount of service) left on it.

When the pre-paid service amount on the dongle 200 gets close to a predetermined amount (e.g., zero or in the vicinity thereof), the subscriber takes the dongle 200 to a vending machine, plugs it in and makes a payment to add value to the dongle, and optionally change her service plan. Cash preferably is one of the acceptable forms of payment. The new balance shows up on the dongle 200.

If the subscriber chooses, she may return the dongle to a store or vending machine and get a refund of the deposit amount plus the pre-paid balance left on the dongle 200. (Service providers may prefer to refund only a fraction of the service charge to encourage affinity) She may also purchase a brand new dongle from the same vending machine. A subscriber may own multiple dongles, and may switch between dongles several times a day. Subscribers may also swap or trade dongles with other subscribers.

If the service provider requires the subscriber to install any custom software on her machine, then the service provider preferably makes this software available in source code form. The service provider may also make this code available in a compiled and packaged form to aid subscribers. Other businesses or universities may offer this compiling and packaging service.

Alternatively, the subscriber may request a trusted party (such as a systems administrator at her place of employment) to install the software for her.

If a subscriber loses her dongle, then the subscriber has lost the cash equivalent of the deposit amount plus the unused balance on the dongle. This is the risk the subscriber undertakes as the price for increased privacy.

All dongles preferably are made to appear identical to the eye of the subscriber with the exception of the balances shown on them.

However, though outwardly identical, each dongle preferably has a unique MAC address that is "burned in" (e.g., fixed) and cannot be modified by software. Dongles 200 do not in actuality maintain any running balances, but instead they merely display balance information that they obtain from the access point. Dongles 200 may maintain statistics to help the infrastructure compute running balances.

More specifically, from the service provider's deployed model, an analogy can be drawn with some cellular phones in which a smart chip (e.g., a GSM device) can be provided to the phone. Indeed, the phone is merely a shell, with all the "brains"/electronics being located on the chip. The smart chip is modular and can be purchased for cash or the like for a predetermined number of units of service.

However, a cellular phone is a two-way device which sends and receives messages. Thus, one typically does not want the phone number to change frequently since then everyone of the user's friends/acquaintances must be notified of such a change.

However, with a wireless network card, since no one is calling the network card (e.g., the card is mainly used for outbound service and pulling-down information), and thus changing the number is not an issue, and changing the number is actually advantageous for location privacy. A unique number such as a telephone number, is not needed for a network card.

To meter service, the service provider preferably maintains a database indexed by MAC addresses indicating the balance left on the corresponding dongle 200.

Theft due to MAC address spoofing (e.g., on hardware not controlled by the service provider) is limited by security mechanisms (e.g., discussed in further detail below under the heading "EXEMPLARY SECURITY MECHANISMS") used by standard-issue dongles as part of the automatic sign-on. Since dongles 200 are preferably returned to vending machines or stores for refill, these refill opportunities permit the service provider to upgrade the security mechanism on the dongles. Other than a security update, the refill operation is merely a database update changing the remaining balance associated with a MAC address.

Dongles 200 preferably carry a tamper-evident seal with a warning threatening prosecution if the dongle is tampered with. Since the subscribers do not sign any explicit license agreements with the service provider, the seal gives the service provider the authority to legally prosecute anyone who tries to break into the dongle and compromise the security mechanism. The intent of the seal is not to prevent reverse engineering, but to deter reverse engineering. Prevention of reverse engineering is also possible by using ideas described by Dyer et al (e.g., see Dyer, J. G., Lindemann, M, Perez, R., Seiler R, van Doorn, L., Sean W. Smith, Weingart, S.: Building the IBM 4758 Secure Coprocessor, IEEE Computer, Vol 34 No 10 (2001) 57–66).

Obviously, there is a trade-off between the cost of security versus the cost of losses on account of stolen service. Careful monitoring of suspicious usage patterns, periodic security updates, and legal deterrents are used to limit large-scale theft of service by a thief selling spurious dongles.

Exemplary Solution From Subscriber's Perspective

Figure 3A:
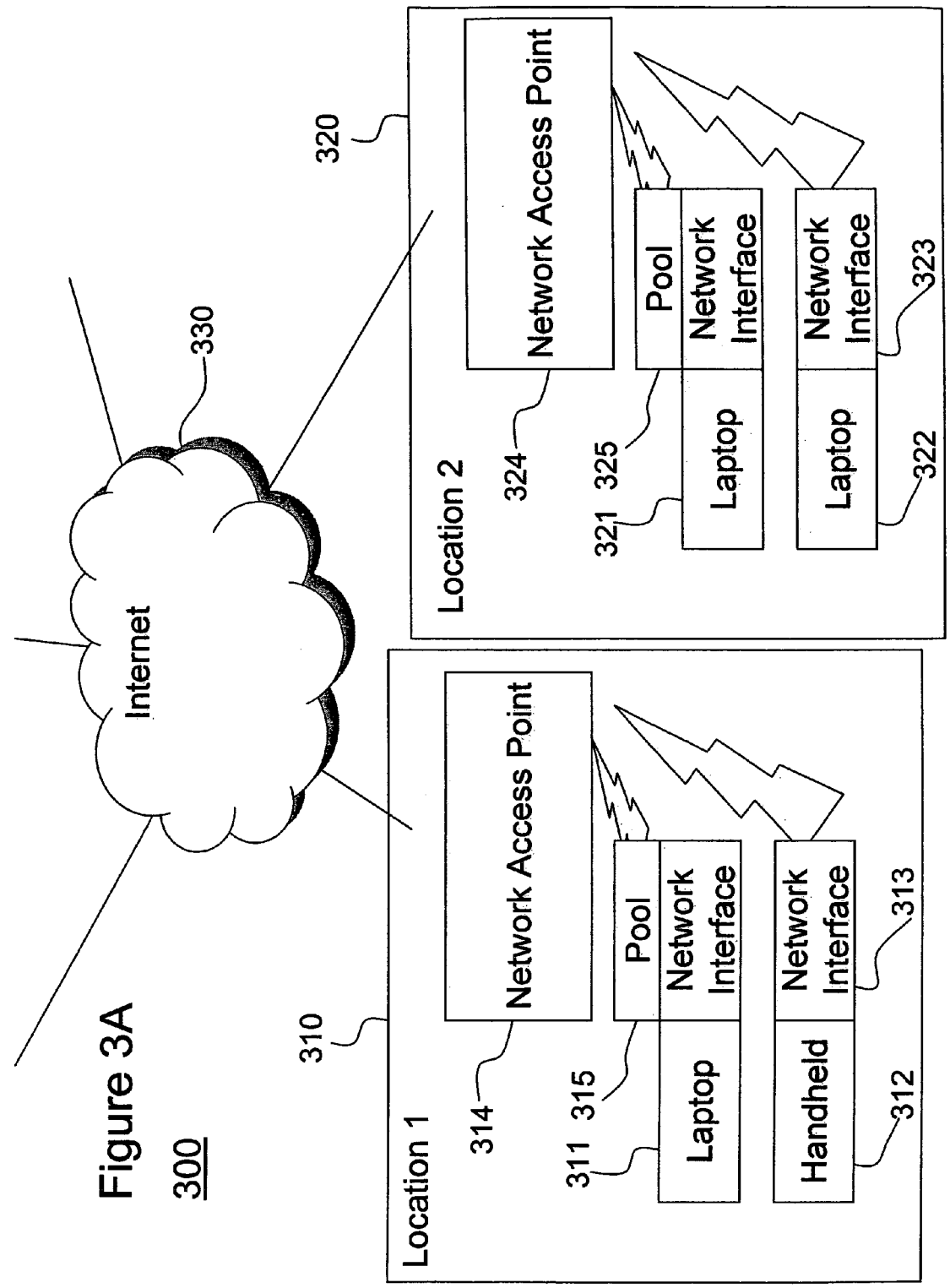
FIG. 3A illustrates a block diagram of a structure 300 according to the present invention from a perspective of a user.
Figure 3B:
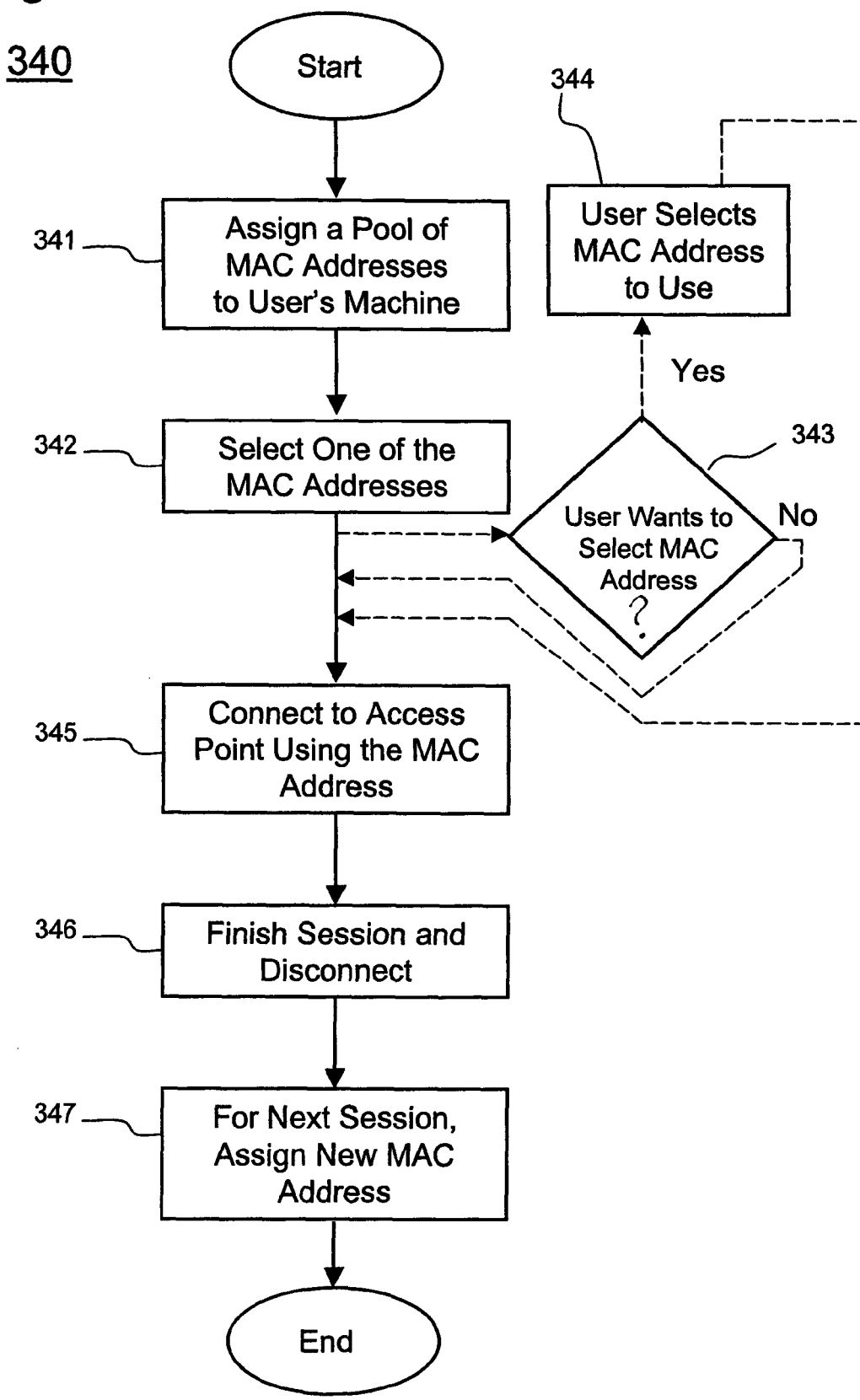
FIG. 3B illustrates a flowchart of a method 340 according to a first exemplary embodiment of the present invention from a user's point of view.

In addition to the above and turning now to FIGS. 3A–3C, another technique for preserving a user's privacy (e.g., this time from the user's point of view) is shown.

FIG. 3A illustrates a block diagram of a system 300 according to the present invention, but again this time from the user's perspective and what the user can do affirmatively and purposely on their end to safeguard their privacy without relying on or obtaining any assistance from the service provider.

System 300 includes a plurality of location (e.g., first and second locations 310, 320), each of which is connectable via a network 330 (e.g., a public network such as the Internet).

Location 310 includes a mobile computing device 311 (e.g., a laptop, IBM ThinkPad®, etc.), a handheld device 312 (e.g., a Personal digital assistant (PDA) such as a Hewlett-Packard IPAQ® or the like), each of which is connectable to a network interface 313.

Network interface 313 is connectable to the network 330 via a network access point 314.

Location 320 may have a similar structure as location 310, and may include a mobile computing device(s) 321, 322, each of which is connectable to a network interface 323. Network interface 323 is connectable to the network 330 via a network access point 324.

In one embodiment (from the user's perspective) according to the present invention, the user's machine is issued a plurality of MAC addresses from the manufacturer. Typically, a single MAC address (e.g., a unique number) is provided to a user based on the user's machine by the manufacturer (e.g., at the factory).

However, in the embodiment of FIG. 3A and as shown in the method 340 according to the present invention, in step 341, a pool 315/325 (e.g., see FIG. 3A) of such MAC addresses (e.g., possibly having 100–200 of such addresses, but of course any number could be provided) may be assigned to the network interface 313/313 by the factory on the user's local machine (e.g., on some type of storage). With such a pool 315/325, the user can remain anonymous while using one of the MAC addresses in the pool 315/325.

It is noted that while FIG. 3A appears somewhat similar to FIG. 1, it is noted that the laptop 311 or handheld device 312 abut the network interface indicating that the same is not necessarily detachable or removable from each other (e.g., the network interface could be built in, etc.), as in the invention of FIG. 1 (e.g., from the service provider's point of view in which the removable dongle was provided).

That is, no single MAC address is associated with any single machine and thus no tracking can be performed. Hence, when it is judged that the user needs to connect to a certain access point (e.g., at each suspend/resume or the like), in step 342, a MAC address selected randomly from the pre-assigned pool 315/325 may be provided and the user can then connect for that session (e.g., step 345). In step 346, the user finishes the session, and disconnects.

In step 347, when the user connects again (e.g., when the user moves from one hotspot to another), another different MAC address from the pool is assigned for the new session.

Thus, using such a pool 315/325, there will be no ability to track the user, and there will be no association of the entire pool of MAC addresses with the specific user. While the service provider may be able to track a specific MAC address at a specific location (e.g., if the MAC address was used at a Starbucks®, and then used again at an airport several months later), none of the intervening activities will be able to be tracked looking at the same MAC address.

Specifically, the same MAC address will not have been used in the intervening activities. Preferably, some form of random number generator is used to select a specific MAC address for a session, and index in a table of the MAC addresses.

Thus, the granularity of tracking will be extremely coarse.

It is noted that the MAC addresses are uniquely assigned to the user's machine (e.g., Network Interface Card (NIC)). Thus, the MAC addresses used are unique among users, and no two users will have the same MAC address. Preferably, the pool of MAC addresses are non-contiguous to make tracking even more difficult.

Notwithstanding the above and even with the use of the pool 315/325 of MAC addresses in a rotating fashion, privacy may still be compromised, in that the service provider still has a unique identifier with which to tack the user (e.g., the user's ID and password).

Thus, another aspect of the invention is illustrated in FIG. 3C. Specifically, a method 350 of the present invention (which can be used alone or in combination with the pool 315/325 of MAC addresses discussed above) is provided in which the user preferably forms a club or group, which buys a block of subscriptions from the service provider (e.g., in step 360). Each subscription preferably has its own user ID and password.

Hence, in step 370, at sign-on, one of the subscriptions may be used by a user (e.g., a member of the group) transferred from this block of subscriptions.

In step 380, the connection is made.

Thus, the service provider can merely note that one of the members of the group is at a particular location, without pinpointing which specific member it is. Further, if a second user attempts to use the same subscription being used by a current user, the service provider may do nothing (e.g., let both users use the subscription), or can use a standard model or may reject access to the second user (e.g., in such a case, it may send a message to the second user that the ID/password is not currently available and that the second user should try another ID/password.

Again as noted above, such techniques can deployed together or separately for increased location privacy.

It is noted that the system also can be easily and optionally tailored to provide a user software which keeps track of user IDs/passwords and keeps track of MAC addresses used previously at a particular site or the like. Thus, returning to FIG. 3B, the user can optionally override the system and intervene such that the user can input his preference with regard to which MAC address to use of the pool.

Such could be implemented optionally as a decision block in step 343 (e.g., see FIG. 3B) in which the user is queried whether the user wishes to select a MAC address for use. If so, the process proceeds to step 344 at which the user selects the MAC address, and the method then proceeds to step 345 described above.

Hence, when the system comes back with a specific MAC address, the user may intervene at this point and indicate he wishes a different MAC address for a particular session.

By the same token, an interactive message may be sent to the user. Such an exemplary message may query "This MAC address was used 6 months ago at this location. Do you wish to continue and use this MAC address, or do you wish to find a new one which has never been used at this location?"

It is noted that, at many hotspots, the access does not require a log-in. That is, a user ID and password are not required for access since the hotspot (e.g., a coffee shop, etc.) provides such an access as a service/convenience to its customers. Hence, no log-in is required and the above notion of using a block of user ID/passwords is not relevant here.

It is noted that the pool 315/325 of MAC addresses should be stored in a secure way (e.g., not easily accessed) such as a special computing platform on the local machine, so that the entire pool 315/325 cannot be accessed and make a correlation that the pool belongs to one user.

Another issue is that MAC addresses mentioned above with regard to a wireless network card, are also used in wired networks (e.g.,. Ethernet® networks in which the laptop's Ethernet card is plugged into a wall jack and the laptop is using its MAC address and sending it on a wire).

Thus, the above techniques of the invention are advantageous to both wired and wireless networks.

It is noted that several levels of service may be provided to the user depending upon how much the user may be willing to spend. That is, if the user is highly concerned about location privacy, he may not want to ever have the same MAC address used again.

Thus, the manufacturer may offer a device for more MAC addresses in such a case, at a higher price than a machine which has a more limited number of MAC addresses. Much of this depends upon how many (and how frequent) public sessions a user has and the user's willingness to accept decreased location-privacy.

It is noted that, when an association is made at the wireless network, the laptop typically sends its host name (e.g., whatever name configured on the user has configured on the laptop). It is possible that several users may have selected the same name or that a generic name has been selected by one or more laptops. However, while the name itself is probably not that useful for location tracking, it still may provide some indication of the user and his location, or reveal something about the user. Thus, the invention may also select a random string for a user's host name every time, so that the host name cannot be used for location tacking. Again, this can be used in combination with other aspects discussed above and below.

Exemplary Security Mechanisms

Hereinbelow is described exemplary security mechanism which are applicable to the first embodiment (e.g., the embodiment of the "dongle"/detachable network interface used by the service provider) from the service provider's perspective.

Having described the above embodiments from the service provider's perspective and from the user's perspective and keeping the same in mind, it is noted that he well-publicized failure of WEP was caused by an attempt to solve all of the problems of confidentiality, integrity as well as access control using a very simple shared secret (e.g., see Borisov et al., supra). Not only was the same secret shared across all communicating entities, the basic security protocol also had flaws which resulted in the shared secret being revealed without much effort on the part of an attacker. Follow-on efforts to address WiFi security are underway and when an acceptable mechanism is defined, service providers are likely to adopt it.

In the interim, the security mechanism that a service provider is concerned about has a primary goal of limitation of theft. Data confidentiality and integrity are not the primary concern of the service provider. Subscribers can achieve these goals using IPSec or SSL. Service providers would like outright theft prevention, but are usually willing to live with less bullet-proof solutions if the cost is lower.

The theft limitation problem is simpler to solve because it can be solved at a higher level of the protocol stack. For instance, one can permit the client device to associate with the access point, establish an Internet Protocol (IP) address for itself via dynamic host configuration protocol (DHCP), and then authenticate over a transmission control protocol (TCP) connection. Until the client device is authenticated, its packets can be prevented from going out to the Internet by outbound packet filtering.

While low level (WEP style) data confidentiality and integrity may be useful, they do not play a pivotal role in sign-on authentication accomplished at a higher level of the protocol stack.

One simple exemplary mechanism is to use the balance associated with a MAC address. When the client device attempts to obtain WiFi service, the MAC address can be looked up to verify whether its balance is non-zero. Unsold dongles report a zero balance. The balance lookup preferably can occur either at the WiFi association request level, or higher up the stack.

Admittedly, this extremely simple scheme may be susceptible to theft. A thief can passively observe valid MAC addresses, and spoof MAC addresses to not only gain access to service but also deplete the account balance of the victim. Though similar schemes of recording numbers at the point of sale are used by many scratch-off pre-paid phone cards, this may be inadequate since stealing MAC addresses is easy, while stealing phone card pins is difficult.

Going one step further, the service provider may optionally place one secret key on all of the dongles.

Again as described above with regard to FIG. 2C, as part of the sign-on procedure, in step 270, the access point may challenge the dongle to prove that it holds the secret key. The challenge may be in the form of a random number generated by the access point that is sent to the dongle encrypted using the secret key.

In such a case, in step 280, it is determined whether the dongle is authenticated. That is, the dongle hardware and software on the client decrypt the number using the secret key, transform the number in a manner that is agreed upon, re-encrypt the number and send it back. If the dongle authenticates in step 280 (e.g., a "YES"), then the customer is allowed access in step 290. Conversely, if the dongle does not authenticate in step 280 (e.g., a "NO"), then the customer is denied access in step 295. It is noted that the client-side operations should be designed in a manner that avoids compromising the secrecy of the key.

Since the number of sign-on requests is likely to be few and far apart, it is unlikely that attackers can compromise this scheme without breaking into the dongle. The secret may be changed periodically, so long as it is done as a rolling upgrade. For service providers, this scheme may offer better security at an added cost of the dongle. The dongle may use non-volatile storage and some crypto-processing capabilities. If the secret on the dongle is leaked, then a thief may manufacture and sell spurious dongles resulting in large scale theft.

Instead of having a single shared key amongst all dongles, the service provider may choose to have a per-dongle secret key, and a database of secret keys indexed by a media access control (MAC) address, as briefly mentioned above.

During the sign-on process, the access point locates the key and challenges the dongle to prove that it has the key. In such a case, an attacker would need to obtain a MAC address and the corresponding key to attack this scheme. The added security of this scheme comes with the additional cost of managing a large number of keys.

As an extreme case, each dongle 200 may be assigned a certificate with a corresponding private key that is stored in the dongle. The dongle and the access point may set up the equivalent of an SSL connection with both server and client side certificates as part of the sign on procedure. Gupta et al. (e.g., see Gupta, V. and S. Gupta, S.; Experiments in Wireless Internet Security," in Proc. Wireless Communications and Networking Conference, (March 2002), 860–864) have demonstrated the viability of SSL on small devices. The dongle can also be much more powerful than the small programmable interrupt controllers (PIC) and limited memory in smart cards.

In all of the methods, there is a trade-off between cost of deploying the solution and the protection that the service provider obtains. The decision is entirely up to the service provider, and transparent to the subscriber. A key aspect in the eyes of the subscriber is the ease of use that comes with the elimination of the sign-on step.

From a layman's perspective, the solution achieves privacy by breaking the connection between the user's personal information (e.g., such as name, address or e-mail address) from the information used to sign on and use the WiFi services. The user never overtly reveals personal information to the service provider.

However, from a technical perspective the solution has many more aspects. Some exemplary aspects are described below.

Sign on user-id or MAC address: The dongles have a unique MAC address and may also carry other unique identifiers. While such identifiers enable the service provider to track the precise location of the dongles, the rest of the inventive method attempts to break the connection between the dongle and the particular user, making such unique identifiers useless from the perspective of tracking a particular user's location. All of the different aspects of the solution are schemes that aid in breaking this connection.

Client-side software: All efforts to unlink the identity of the subscriber from the identity of dongle can be easily compromised if the service provider requires the installation of a piece of opaque software on the subscriber's device. Software that executes on the subscriber's device may be privy to information that can readily identify the user. Malicious client-side software may enable location tracking even with all of these mechanisms in place.

The only protection against this is to make the client-side software transparent and open to public scrutiny. While most non-technical users are unlikely to examine the source, experts and privacy advocates will probably complain if a problem exists.

Pre-paid versus post-paid: In a pre-paid service model, the metering of the delivered service does not require the identification of the consumer of the service. It is conceivable that one could design a post-paid service model that shields the identity of the user from the service provider using complex anonymous credit schemes (e.g., see Low, S. H, Maxemchuk N. F., Paul S., Anonymous Credit Cards. In Proceedings of second ACM Conference on Computer and Communication Security. (1994) 108–117). However, a pre-paid model can be chosen since it is simpler and easier to understand.

A pre-paid service model, which can be purchased using cash, is a simple model that can be easily explained to a non-technical user. Most users readily understand and appreciate the anonymity of cash purchases. Subscribers who desire a greater assurance of their privacy can pay for the dongles using cash.

Pre-paid models can also be attractive to service providers since they get paid in advance for service they will deliver in the future. In addition, there may be cases where some customers who pre-pay may not actually consume all of the service they are entitled to, which again works in favor of the service provider.

It is noted that pre-paid models deter impulse peaks in service consumption which can result in significant revenues to the service providers. While prevention of such peaks may indeed be a feature that is valued by some customers, service providers may not like it. Most users tend to prefer flat rate plans in any case, where impulse peaks are not an issue.

Obvious value of the dongle: While cash offers anonymity to the subscriber, many subscribers may not like carrying large amounts of cash. In some countries where anonymous cash cards such as Visa Cash (e.g., see Visa Cash. http://international.visa.com/products/vcash) are available, these may be used instead with the same anonymity properties of real cash.

However, some customers may wish to purchase the dongles using a non-anonymous payment mechanism such as a credit card or a personal check. When a subscriber uses such a payment mechanism, there is the potential of making an association between the subscriber's identity and the MAC address of the dongle, especially if no corporate boundaries exist between the merchant accepting the payment and the service provider.

The displayed balance on the dongle helps customers, even those who use non-anonymous payment schemes, achieve privacy. The balance displayed on the dongle makes barter of dongles possible. That is, one subscriber has the opportunity to exchange her dongle with a friend, perhaps paying her friend in cash for difference in balances left on the respective dongles. It is noted that for enhanced privacy, one only needs to allow for the possibility of such exchanges.

Thus, even if no barter actually takes place, the mere suggestion of a non-mediated and an unrecorded barter breaks the association between the dongle purchaser and the dongle user. The possibility of barter makes it impossible for the service provider to reliably match dongles with users. A subscriber may lend her dongle to a friend. The friend gets a chance to try out public WiFi access and may pay the subscriber for usage based on the difference in the balance shown. The possibility of lending also breaks the association between the purchaser and user. For the service provider the lending of dongles is a valuable form of free word-of-mouth advertising.

Since dongles can be purchased using different payment schemes (e.g., cash, credit card, check), it is useful to have a visual indication of which method was used to purchase the dongle. Vendors generally prefer to refund the deposit amount using a payment scheme similar to the one used at purchase time.

Having an indication of the payment method can help subscribers understand what form of payment they can expect when they eventually claim their refund on the dongle. The indication may or may not limit barter to dongles that were originally purchased using identical payment schemes depending on the preferences of the individual subscribers. Service providers should be willing to refund the deposit amount to a credit card owned by the current holder of the dongle, regardless of who originally purchased it using a credit card.

Display of the value associated with a dongle may be difficult when the dongle is not plugged in or away from a hotspot, since the information is in the infrastructure and not in the dongle itself. It is acceptable for a service provider to limit the activation of the value display to hotspot locations. Such a limitation will only serve to limit the physical locations where barter can take place.

However, it is noted that a permanent display on the dongle only requires a small battery in the dongle. The dongle displays the most recent balance information that was sent to it. Since the power load on this battery is expected to be quite low, it is conceivable that the battery can last until the dongle hardware becomes obsolete.

Most barters are likely to occur only amongst subscribers who know each other, so while it is desirable to make hacking the displayed value difficult, it is not a fundamental security exposure. That is, the actual values are maintained in the back-end anyway. While hacking the displayed value can help one subscriber cheat another, it does not result in any theft of service. In addition to enabling lending and barter, having an obvious cash value on the dongle is important to subscribers, since it helps them monitor usage.

Barriers to entry: One of the general arguments against pre-paid service models is that such models pose a barrier to entry. Some customers may not want to pay a significant amount of money in advance for service with which they have no experience. Similar barriers in the form of long-term service contracts exist in the post-paid model as well.

Nevertheless, there is a need to reduce the deposit amount to lower the barrier to entry. The deposit amount protects the service provider from bearing the cost of the dongles that are not returned. Given the current costs of network interface hardware in relation to the price of the service, completely eliminating the deposit may be difficult in the near term.

Service providers may want to work around this issue using innovative pricing schemes that enable customers to try out the service for a nominal monetary cost, and maybe even a nominal privacy cost during the trial period. In other words, the subscriber needs to reveal her identity during the trial period so that the service provider can be protected from significant monetary losses.

Service providers also dislike imposing the difficulty of periodic refills on their customers. The client-side software may offer to take a credit card number and do automatic refills. Customers concerned about their privacy can choose the cash refill option. If provided, then the credit card number should be kept on the client machine and not be permanently associated with the dongle since the dongle can be traded.

Location-based services: WiFi service providers are hoping to use location-based services to generate additional revenues. The present invention solves both problems.

That is, the present invention enables service providers to offer several location-based services to their subscribers without compromising subscriber location privacy. For instance, the client side software can pop-up a coupon for a local restaurant on the screen of a WiFi subscriber at lunch time. The subscriber may also indicate her dietary preferences to the client-side software to filter such offers.

Built in wireless interfaces: Mobile computer manufacturers are beginning to offer computers with integrated WiFi network interfaces. While built-in interfaces offer a lot more convenience compared to external attachments, built-in WiFi interfaces often come with pre-assigned MAC addresses.

As mentioned earlier, this MAC address has a strong association with the subscriber who owns the computer. Even without an explicit sign-on process, the subscriber's identity may be revealed and can be logged as being associated with that particular MAC address. From that point on, the subscriber's location privacy is compromised.

Essentially, the subscriber should be careful to not enable the service provider to associate the MAC address with her identity. Subscribers are unlikely to be careful enough. A simple step such as filling out a non-secure sockets layer (SSL) protected web form with an e-mail address or a listed phone number is enough to permanently leak location privacy, and also link past MAC address logs with a user identity.

Even in the inventive technique, the service provider may be able to associate a leaked identity with the subscriber's current MAC address. However the service provider cannot be reliably assured that this association will persist at the next sign-on due to the possibility of dongle barter. As a result, the return on investment (ROI) equation on the cost of acquiring this information is unlikely to be satisfied.

There is discussion underway in the standards bodies towards temporary MAC addresses that get assigned dynamically (e.g., see Orava P, H. Haveniren, J-P. Honkanen, Edney, J,: Temporary MAC Addresses for Anonymity. IEEE Document doc.: 802.11-02/261r2). Dynamic MAC addresses may help address some privacy leaks, but it may take a long time before dynamic MAC addresses become the default. Hereinbelow is described dynamic MAC addresses in further detail.

Initial roll out costs: Preferably, the service providers should incur the cost of deploying and operating dongle vending machines at hotspot locations. While this cost is likely to be significant, it does not have to be all incurred at once. This scheme can be incrementally rolled out, and can potentially coexist with traditional solutions that do not offer the same level of subscriber privacy. Initially dongles may be sold and refilled on the net. Vending machines and sales at regular stores may come after the provider has developed a customer base.

WiFi service providers also face a fundamental practical difficulty of showing their subscribers where exactly the coverage hotspots are. Readily identifiable vending machines can also be used as indicators of WiFi hotspots. In addition, the presence of other subscribers working on their mobile computers, with their dongles attached will be a visible indicator of the presence of a hotspot. The dongles 200 themselves can act as advertising vehicles by triggering the curiosity of non-subscribers.

The store or the vending machine will need access to the network in order to communicate with the WiFi service provider as part of the activation or deactivation of the dongles. For vending machines at WiFi hotspots, this problem is easily solved by providing the vending machine with a WiFi interface of its own.

USB: The discussion above has been directed to USB dongles, since USB is a popular and widely-supported interface.

However, one can easily support other interfaces such as Personal Computer Memory Card International Association (PCMCIA), CompactFlash, etc. Self-service vending machines that print out hard copies of digital photos are widely deployed and accept different formats such as Smart media, memory stick, compact flash, etc. Designing a vending machine that works with dongles conforming to different interfaces is well within the grasp of one of ordinary skill taking the present application as a whole.

Other privacy leaks: While the inventive scheme can help plug a privacy leak, there are several other ways in which a subscriber can leak their location information.

If the confidentiality of the WiFi communication traffic can be compromised, then the subscriber risks the loss of both their location privacy as well data that may be much more valuable. Therefore, better over-the-air security protocols will certainly be designed in the near term. In addition, even non-technical subscribers are likely to use VPN software to tunnel into their corporate intranets, offering better confidentiality and integrity, at least to their corporate communications. They are also likely to use SSL to protect some of their communication with outside sites.

Even if the confidentiality of some of the communication is preserved, the user may still be leaking "coarse" location information. For instance, when the user browses a web site on the network, the IP address that was assigned to the user may be traceable to the particular city or a particular service provider. While several solutions to this problem exist (e.g. Anonymizer.com), the one that may be simplest and easiest for non-technical users is configuring their browser to use a proxy within their intranet. This way all traffic originating at the mobile computer will pass through the VPN tunnel into the intranet first, and then out to the Internet without the subscriber's IP address being visible to all sites visited.

Research in the areas of security and privacy in electronic communications, pre-dates WiFi networks by several decades. Cryptography theory (e.g., see Schneier, B.; Applied cryptography (2nd ed.): protocols, algorithms, and source code in C, John Wiley & Sons, Inc., New York, N.Y., (1995); Stallings, W.; Cryptography and network security (2nd ed.): principles and practice, Prentice-Hall, Inc., Upper Saddle River, N.J., (1998)) is a well established field that underlies several protocols and schemes devised to support privacy in electronic communications.

Several fundamental results in this area have arisen out of the quest for creating an electronic version of cash. Chaum's MIX networks (e.g., see Chaum, D.: Untraceable electronic mail, return addresses, and digital pseudonyms. Communications of the ACM, Vol 24 No. 2 (1981) 84–88), which rely heavily on asymmetric key cryptography form the basis for several protocols such as Onion routing (e.g., see Goldschlag, D. M., Reed, M. G, Syverson, P. F.; Onion Routing for Anonymous and Private Internet Connections, Communications of the ACM, vol. 42, num. 2, (1999)) that provide anonymity in electronic communications.

Reed et al (e.g., see Reed M., P. Syverson and D. Goldschlag, Protocols using Anonymous Connections: Mobile Applications, 1997 Security Protocols Workshop), discuss a scheme for hiding cell phone location using caller anonymity obtained using Onion routing.

All of these schemes rely on interposing a collection of proxies between the communicating parties. If at least one of the proxies guarantees secrecy, then the privacy properties are preserved. Presently, it may not be possible to interpose a proxy between a WiFi card and the public WiFi access point.

Recently, Jiang X., Hong, J. I., Landay, J. A., Approximate Information Flows: Socially-Based Modeling of Privacy in Ubiquitous Computing. In proceedings of Ubicomp (2002) 176–193, proposed tackling the privacy issue by balancing the outflow of private data with feedback to users about the gathering of data. While feedback is useful to raise awareness, it is important to plug all leaks that can be plugged easily.

Another method (e.g., see Molina-Jiménez, C, Marshall, L,; Anonymity without Mixes. In: Second IEEE Workshop on Internet Applications (WIAPP '01), San Jose, Calif. (2001), 32–40) proposed a method for sending anonymous e-mail to a known recipient from a wireless hotspot using the concept of a dynamically generated MAC address coupled with payment using anonymous e-cash.

It is noted that the problem addressed by Molina-Jiménez is more complex than the one addressed by the present invention, and accordingly the solution relies on asymmetric key cryptography along with the broadcast of public keys. An implementation of this scheme would require substantial changes to the WiFi infrastructure, which require a strong and practical business case.

The potential for fixed MAC addresses leaking privacy information is a problem that is being discussed in the 802.11 standards bodies (e.g., see Orava et al., supra). One of the proposals to combat this problem is to make the mobile computers request temporary MAC addresses from the access point, in a manner similar to the one used by mobile computers to request temporary IP addresses from a DHCP server.

In the case of dynamic IP addresses, the mobile computers rely on a unique MAC address to communicate with the DHCP server. Assigning a MAC address dynamically is harder because there is a boot-strapping problem. In other words, there is no underlying unique address to rely on for sending the first request. The proposed solution relies on mobile computers choosing random addresses just to send out the initial request. The access point assigns a MAC address to the client, which is used for future communications. Not all access points are expected to support dynamic MAC addresses. Eventually, if and when dynamic MAC addresses become the default in WiFi networks, the privacy leak due to fixed MAC addresses will get plugged.

For true location privacy in subscription-based public networks, one also preferably should eliminate unique user ids for signing on. Once dynamic MAC addresses are default, the inventive scheme can be simplified to one along the lines of a pre-paid phone card. Subscribers can buy a scratch-off card with a pre-printed user-id and password and use these pieces of information to obtain network access.

In fact, a scratch-off card scheme already exists but without dynamic MAC addresses. Current users of the Cometa™ wireless service available at McDonalds™ restaurants, can purchase a pre-paid card with a temporary user id and password. However the pre-paid card does not plug the leak of location privacy as discussed above.

Systems based on scratch-off pre-paid cards are also more susceptible to service theft since the service provider cannot design as strong a security mechanism as they could have with the dongle mechanism proposed above, since the dongle is a piece of hardware the service provider controls and can periodically update as well.

The potential for MAC addresses leaking location privacy has also been recognized by the IPv6 community. One of the proposals for IPv6 address assignment is for each computer to assign itself an IPv6 address formed by concatenating a router advertised prefix with its own MAC address. The privacy problems associated with this approach are more acute than the ones discussed above. The MAC address is normally seen only in the immediate vicinity of the mobile computer.

However, if the MAC address is part of the IPv6 address, it is observable by everyone. From a privacy perspective, this is similar to making a person's cell phone number by prefixing their social security number with an area code. Not only does the user reveal her (coarse-grain) location, but also her complete identity, when communicating. A standard's track request for comments (RFC) (e.g., see Privacy Extensions for Stateless Address Autoconfiguration in IPv6. IETF RFC 3041) is under discussion in the Internet Engineering Task Force (IETF) to address privacy concerns.

Some of the complexities associated with the inventive solution, namely preferably deploying vending machines where dongles can be purchased using cash can be ameliorated if truly anonymous e-cash were available. Several proposals for anonymous e-cash have been investigated (e.g., see Asokan, N., et al., The State of the Art in Electronic Payment Systems. IEEE Computer 30(9), September 1997, 28–25), but none of these has had widespread success.

Therefore, the inventive method preferably uses the real cash that users are familiar with. Once e-cash becomes available, the present invention may become even simpler since it is an ideal choice for refilling dongles.

In sum, technology is constantly improving the ability to track the location of people and things to much finer granularities. While location tracking of things such as parcels, shipping containers, livestock, wildlife, etc., is useful, privacy concerns must be addressed when similar technologies can be applied to tracking people. When the location of a tracked device reveals the location of a person, a privacy hole is created.

Owners of mobile phones or pagers can be continually tracked at a relatively coarse granularity. WiFi network users can be tracked to much finer granularities. However, users should not have to give up their location privacy in order to benefit from the convenience of public WiFi networks, nor should they be required to take complicated steps to safeguard their privacy. WiFi service providers also need solutions that enable them to operate profitably while respecting the privacy of their subscribers.

As described above, the present invention provides a simple and practical solution that achieves the above goals.

Preferably, the inventive method uses an externally attached WiFi interface dongle that can be purchased and bartered in transactions that break the association between the subscriber and the dongle.

The inventive method also preferably enables service providers to offer location-based services even while subscribers retain their right to location privacy.

Additionally, the present invention enables non-technical users safeguard their location privacy by continuing to rely on well understood and familiar technologies such as SSL and VPN. The invention may also be used along with existing anonymity technologies for greater privacy protection. The inherent complexity associated with the different amounts of private information that can be acquired, retained and correlated, has resulted in a major effort on the part of technologists (e.g., see Platform for Privacy Preferences. http://www.w3.org/P3P/) to simplify and present privacy related information in a manner that non-technical users can comprehend it. Comprehending privacy and the loss of privacy are fundamental steps before users can take action to protect it.

Figures 4, 5:
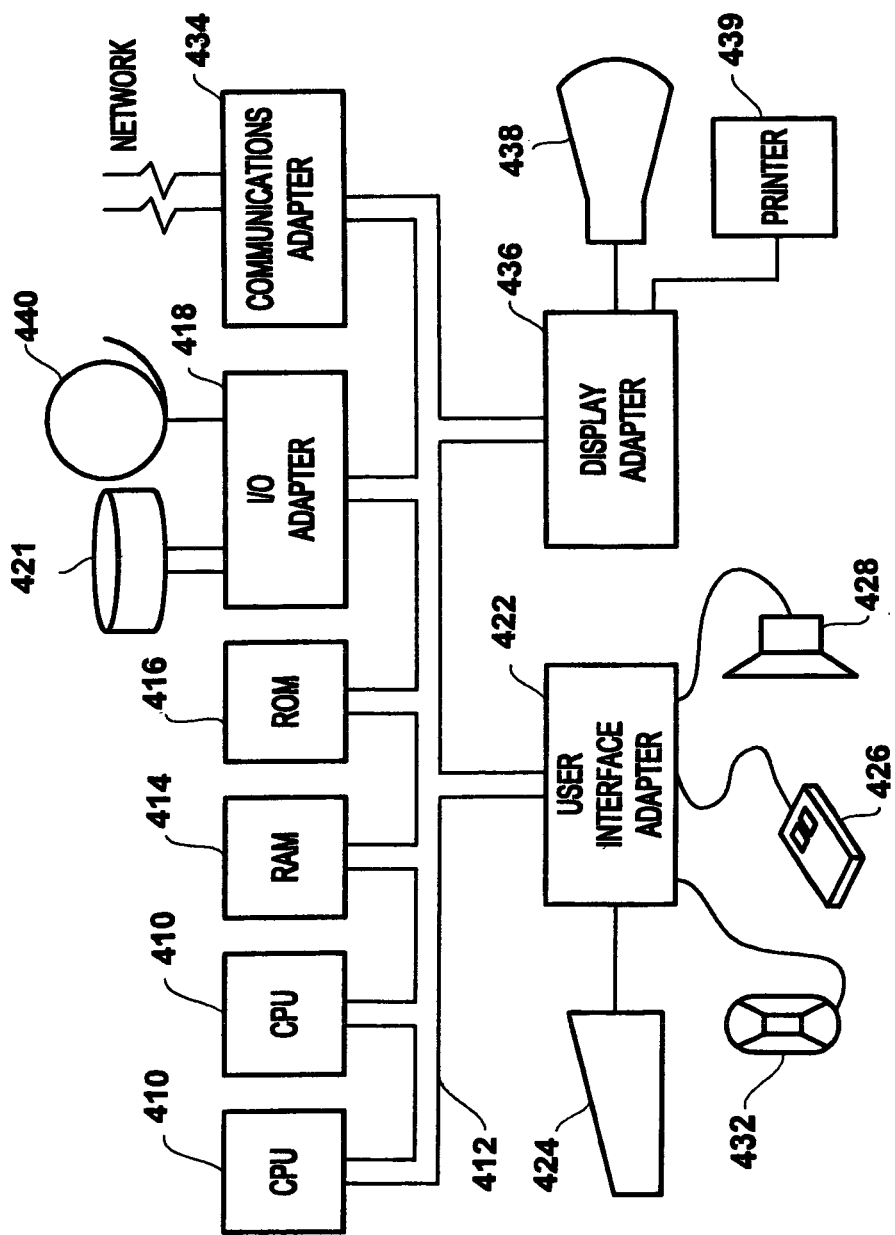
FIG. 4 illustrates an exemplary hardware/information handling system 400 for incorporating the present invention therein.
FIG. 5 illustrates a signal bearing medium 500 (e.g., storage medium) for storing steps of a program of a method according to the present invention.

FIG. 4 illustrates a typical hardware configuration of an information handling/computer system for use with the invention and which preferably has at least one processor or central processing unit (CPU) 411.

The CPUs 411 are interconnected via a system bus 412 to a random access memory (RAM) 414, read-only memory (ROM) 416, input/output (I/0) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a local area network (LAN), etc., and a display adapter 436 for connecting the bus 412 to a display device 438 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the unique and unobvious features of the present invention, improved awareness of privacy issues is provided, and privacy enhancing solutions are provided that are simple to understand and easy to deploy.

Additionally, as described above, the invention provides a simple and practical solution to the leaking of fine-grain location information as mobile users take advantage of pervasive wireless Internet access services.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method of providing location privacy, comprising:
for a mobile computing device, assigning a pool of addresses with which a user can access a network, and preventing a third party from correlating a user's location with the mobile computing device.

2. The method of claim 1, wherein said addresses comprise media access control (MAC) addresses.

3. The method of claim 1, wherein said pool of addresses is assigned by a manufacturer of said mobile computing device.

4. The method of claim 1, wherein said pool of addresses are assigned to a network interface of said mobile computing device by a manufacturer and are unknown to a third party.

5. The method of claim 1, wherein, when a user is to connect to an access point, a random address from said pool is provided, thereby allowing the user to connect to the access point.

6. The method of claim 5, wherein, when the user connects subsequently, a second address from the pool is used, said second address being different from said random address.

7. The method of claim 1, wherein said pool of addresses comprise non-contiguous addresses.

8. The method of claim 1, further comprising:
providing a block of subscriptions to a group, said group including said user, each subscription including its own user ID and password.

9. The method of claim 8, further comprising:
judging whether a user ID and password and an address have been used previously at a particular site by said user; and
based on said judging, subsequently selecting a different user ID and a different address at said particular site for said user.

10. The method of claim 5, further comprising:
overriding, by said user, an address provided for use for said user, and intervening such that the user selects a specific address to use in the pool.

11. The method of claim 1, further comprising:
sending an interactive message to the user.

12. The method of claim 1, wherein said network comprises a wireless network.

13. The method of claim 1, wherein said network comprises a wired network.

14. The method of claim 1, further comprising:
selectively adjusting a number of addresses in said pool made available to said user based on a level of service desired by said user.

15. The method of claim 1, further comprising:
selecting a random string for a user's host name each time said user logs on to an access point, such that the host name is unusable for location tracking.

16. A method of providing a connection to an access point to a network, comprising:
providing a detachable network interface for use in accessing said access point by a computing device, said detachable network interface breaking a linkage between a media access control (MAC) address associated with said computing device and the user.

17. The method of claim 16, further comprising:
metering an amount of service at said access point used by said user.

18. The method of claim 16, further comprising:
placing a secret key on the detachable network interface.

19. The method of claim 18, wherein said secret key is placed on all detachable network interfaces.

20. The method of claim 18, wherein a different one of said secret key is provided for each said detachable network interface.

21. The method of claim 16, wherein said detachable network interface includes a balance display for indicating a balance representing an amount of service remaining on said detachable network interface, and thereby allowing for said detachable network interface to be tradable.

22. The method of claim 16, further comprising:
securely signing onto said network by said detachable network interface without a user performing any explicit action.

23. The method of claim 16, further comprising:
placing authentication information on said detachable network interface such that said network interface signs-on to obtain access to the network without explicit user action.

24. The method of claim 18, further comprising:
challenging the detachable network interface to determine if said detachable network interface contains the secret key.

25. The method of claim 24, wherein said challenging comprises generating a random number by the access point and sending the random number to the detachable network interface encrypted using the secret key.

26. The method of claim 25, further comprising:
authenticating the detachable network interface such that the number is decrypted, on the user side, using the secret key, transforming the number in a predetermined manner, re-encrypting the number and sending the number back to the access point.

27. The method of claim 26, wherein if the detachable network interface authenticates, then the user is allowed access to said access point.

28. The method of claim 18, wherein each detachable network interface contains a secret key unique from one another, said method further comprising:
maintaining a database of secret keys indexed by a media access control (MAC) address.

29. A system for providing location privacy, comprising:
a module for assigning a pool of addresses with which a user can access a network via a mobile computing device, so as to prevent a third party from correlating a user's location with the mobile computing device.

30. The system of claim 29, wherein said pool of addresses is issued by a manufacturer of said mobile computing device.

31. The system of claim 29, wherein, when a user is to connect to a certain access point, said module for assigning provides a random address from said pool, thereby allowing the user to connect to the access point.

32. The system of claim 31, wherein when the user connects again, said module for assigning provides a second address from the pool, said second address being different from said random address.

33. The system of claim 29, wherein said pool of addresses comprises non-contiguous addresses.

34. The system of claim 29, wherein a block of subscriptions is provided to a group, said group including said user, each subscription including its own user ID and password.

35. The system of claim 34, further comprising:
a module for judging whether a user ID and password and an address have been used previously at a particular site by said user; and
a module, based on an output of said module for judging, for subsequently selecting a different user ID and a different address at said particular site for said user.

36. The system of claim 29, further comprising:
a module for overriding the module for assigning and intervening such that the user selects a specific MAC address to use of the pool.

37. The system of claim 29, further comprising:
a module for sending an interactive message to the user.

38. The system of claim 29, wherein said network comprises a wireless network.

39. The system of claim 29, wherein said network comprises a wired network.

40. The system of claim 29, further comprising:
a module for selectively adjusting a number of addresses in said pool made available to said user, based on a level of service desired by said user.

41. The system of claim 29, further comprising:
a module for selecting a random string for a user's host name each time said user logs on to an access point, such that the host name is unusable for location tacking.

42. A system for providing a connection to an access point to a network, comprising:
a detachable network interface for use in accessing said access point by a computing device,
said detachable network interface breaking a linkage between a media access control (MAC) address associated with said computing device and the user.

43. The system of claim 42, further comprising:
a module for metering an amount of service at said access point used by said user.

44. The system of claim 42, further comprising:
a secret key placed on the detachable network interface.

45. The system of claim 44, wherein said secret key is placed on all detachable network interfaces.

46. The system of claim 44, wherein a different one of said secret key is provided for each said detachable network interface.

47. The system of claim 42, wherein said detachable network interface includes a balance display for indicating a balance representing an amount of service remaining on said detachable network interface, and thereby allowing for said detachable network interface to be tradable.

48. The system of claim 42, wherein said detachable network interface securely signs onto the network without a user performing any explicit action.

49. The system of claim 42, further comprising:
authentication information on said detachable network interface such that said network interface signs-on to obtain access to the network without explicit user action.

50. The system of claim 44, further comprising:
a module for challenging the detachable network interface to determine if said detachable network interface contains the secret key.

51. The system of claim 50, wherein said module for challenging comprises a generator for generating a random number by the access point and sending the random number to the detachable network interface encrypted using the secret key.

52. The system of claim 51, further comprising:
a module for authenticating the detachable network interface such that the number is decrypted, on the user side, using the secret key, transforming the number in a predetermined manner, re-encrypting the number and sending the number back to the access point.

53. The system of claim 52, wherein if the detachable network interface authenticates, then the user is allowed access to said access point.

54. The method of claim 42, wherein each said detachable network interface contains a secret key unique from one another, said system further comprising:
a module for maintaining a database of secret keys indexed by a media access control (MAC) address.

55. A method for deploying computing infrastructure, comprising integrating computer-readable code into a computing system, wherein the code in combination with the computing system is capable of performing the method of claim 1.

56. A method for deploying computing infrastructure, comprising integrating computer-readable code into a computing system, wherein the code in combination with the computing system is capable of performing the method of claim 16.

57. A signal-bearing medium tangibly embodying a program of machine-readable instructions executable by a digital processing apparatus to perform the method of claim 1.

58. A signal-bearing medium tangibly embodying a program of machine-readable instructions executable by a digital processing apparatus to perform the method of claim 16.

* * * * *